United States Patent
Zhou et al.

(10) Patent No.: US 11,461,111 B2
(45) Date of Patent: Oct. 4, 2022

(54) METHOD FOR RUNNING APPLETS, AND ELECTRONIC DEVICE

(71) Applicant: BAIDU ONLINE NETWORK TECHNOLOGY (BEIJING) CO., LTD., Beijing (CN)

(72) Inventors: Dan Zhou, Beijing (CN); Qian Liu, Beijing (CN); Zhixing Lei, Beijing (CN); Shuo Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 155 days.

(21) Appl. No.: 17/255,045

(22) PCT Filed: Jul. 14, 2020

(86) PCT No.: PCT/CN2020/101969
§ 371 (c)(1),
(2) Date: Dec. 22, 2020

(87) PCT Pub. No.: WO2021/139127
PCT Pub. Date: Jul. 15, 2021

(65) Prior Publication Data
US 2021/0406033 A1 Dec. 30, 2021

(30) Foreign Application Priority Data
Jan. 9, 2020 (CN) .......................... 202010023053.0

(51) Int. Cl.
*G06F 9/445* (2018.01)
*G06F 16/955* (2019.01)
*G06F 8/60* (2018.01)

(52) U.S. Cl.
CPC ............. *G06F 9/445* (2013.01); *G06F 8/60* (2013.01); *G06F 16/955* (2019.01)

(58) Field of Classification Search
CPC ............ G06F 9/445; G06F 16/955; G06F 8/60
See application file for complete search history.

(56) References Cited

U.S. PATENT DOCUMENTS

| 5,796,952 A | 8/1998 | Davis et al. |
| 6,560,618 B1 * | 5/2003 | Ims .......................... G06F 9/445 |

(Continued)

FOREIGN PATENT DOCUMENTS

| CN | 109582395 A | 4/2019 |
| CN | 110187913 A | 8/2019 |

(Continued)

OTHER PUBLICATIONS

Peter Schramm et al., "A Service Gateway for Networked Sensor System", [Online], pp. 66-74, [Retrieved from Internet on Jul. 29, 2022], <https://ieeexplore.ieee.org/stamp/stamp.jsp?arnumber=1269133> (Year: 2004).*

(Continued)

*Primary Examiner* — Ziaul A Chowdhury
(74) *Attorney, Agent, or Firm* — Fay Sharpe LLP

(57) ABSTRACT

The embodiment of the present disclosure provides a method and an apparatus for running applets, an electronic device and a storage medium. The method includes obtaining uniform resource identifier (URI) information of the applet based on an opening request when the opening request of the applet is received, wherein a format of the URI comprises a protocol name of a target boot protocol and content corresponding to the protocol, and the target boot protocol is a universal boot protocol applied to a plurality of host applications when opening the applet; analyzing the URI information based on grammatical format description rules of the target boot protocol, to obtain a first parameter and a second parameter; obtaining an execution file package of the applet based on the first parameter; and rendering corresponding page resources in the execution file package (Continued)

based on the second parameter. Therefore, the opening of the applet across clients and servers may be unified with the pre-defined target boot protocol, which provides an important prerequisite for the multi-terminal operation of the applet and ensures that the applet has multi-terminal operation capabilities.

17 Claims, 2 Drawing Sheets

(56) References Cited

U.S. PATENT DOCUMENTS

| | | | |
|---|---|---|---|
| 6,874,151 B1 | 3/2005 | Dean | |
| 8,056,075 B2* | 11/2011 | Balassanian | G06F 9/44526 717/177 |
| 9,083,566 B1* | 7/2015 | Pearson | H04L 69/00 |
| 9,760,528 B1* | 9/2017 | Huynh Van | H04L 41/0843 |
| 2003/0020948 A1* | 1/2003 | Jarvis | H04L 41/046 709/200 |
| 2012/0095850 A1 | 4/2012 | Hamel | |
| 2021/0201296 A1* | 7/2021 | Rule | G06Q 20/353 |

FOREIGN PATENT DOCUMENTS

| | | |
|---|---|---|
| CN | 110321192 A | 10/2019 |
| CN | 110569947 A | 12/2019 |
| CN | 111222062 A | 6/2020 |
| JP | H10124323 A | 5/1998 |
| JP | 2006276939 A | 10/2006 |
| KR | 20140089410 A | 7/2014 |
| KR | 101654957 A | 9/2016 |

OTHER PUBLICATIONS

Christoph Pohl et al., "Semantic Caching of Code Archives", [Online], pp. 1-12, [Retrieved from Interent on Jul. 29, 2022], <https://d1wqtxts1xzle7.cloudfront.net/47952949/Semantic_Caching_of_Code_Archives20160810-15695-1unwymx-libre.pdf>, (Year: 2005).*

Michael J. Wirthlin et al., "web based IP evaluation and distribution using applets", [Online], pp. 985-994, [Retrieved from Internet on Jul. 29, 2022], <https://ieeexplore.ieee.org/stamp/stamp.jsp?arnumber=1214857> (Year: 2003).*

International Search Report of International Application No. PCT/CN2020/101969, dated Oct. 15, 2020, 11 pages.

Office Action for Japanese Application No. 2020-573014, dated Apr. 5, 2022, 3 pages.

Extended European Search Report for Application No. 20824069.7, dated Mar. 31, 2022, 9 pages2022-.

Office Action for Korean Application No. 10-2021-7000245, dated Jun. 27, 2022, 6 pages.

* cited by examiner

METHOD FOR RUNNING APPLETS, AND ELECTRONIC DEVICE

CROSS-REFERENCE OF REALTAED APPLICATION

The present application is a U.S. national phase application of International Application No. PCT/CN2020/101969 filed on Jul. 14, 2020, which claims priority to Chinese patent application No. 202010023053.0 filed on Jan. 9, 2020, the entire contents of which are incorporated herein by reference.

TECHNICAL FIELD

The present disclosure relates to a field of computer technology, and more particularly to a method for running applets, an electronic device and a storage medium.

BACKGROUND

With the rapid development of the Internet technology, various applications have entered into people's daily lives. As an application that may be used without downloading and installing, applets have received a widespread attention from all walks of life. More and more applications are loaded with applets to provide users with more convenient services.

However, in the related art, the applets are opened based on their respective applet open protocols of various applications when loading the applets. For example, the host application A may only use its own open protocol 1 to open the applet C and the host application B may only use its own open protocol 2 to open the applet C, so that the open protocols used by the same applet in different host applications may not be universal, i.e., an open protocol for one applet may only support a fixed host application for opening but does not support a cross-client opening.

SUMMARY

According to a first aspect of the present disclosure, a method for running an applet includes: obtaining uniform resource identifier (URI) information of the applet based on an opening request when the opening request of the applet is received, wherein a format of the URI includes a protocol name of a target boot protocol and content corresponding to the protocol, and the target boot protocol is a universal boot protocol applied to a plurality of host applications when opening the applet; analyzing the URI information based on grammatical format description rules of the target boot protocol, to obtain a first parameter and a second parameter; obtaining an execution file package of the applet based on the first parameter; and rendering corresponding page resources in the execution file package based on the second parameter.

According to a second aspect of the present disclosure, an electronic device includes at least one processor; and a memory communicatively connected with the at least one processor; wherein the memory is configured to store instructions executable by the at least one processor, when the instructions are executed by the at least one processor, the at least one processor is configured to execute a method for running an applet according to the first aspect of the present disclosure.

According to a third aspect of the present disclosure, a non-transitory computer-readable storage medium having computer instructions stored thereon is provided, the computer instructions are configured to cause a computer to execute a method for running an applet according to the first aspect of the present disclosure.

Other effects of the above optional manners will be described below in conjunction with specific embodiments.

BRIEF DESCRIPTION OF THE DRAWINGS

The drawings are used to better understand the solution and do not constitute a limitation to the present disclosure, wherein.

DETAILED DESCRIPTION

Example embodiments of the present disclosure will be further described in detail below in conjunction with the accompanying drawings, wherein various details of the embodiments of the present disclosure are included to facilitate understanding and should be considered as merely exemplary. Therefore, those skilled in the art should recognize that various changes and modifications may be made to the embodiments described herein without departing from the scope and spirit of the present disclosure. Likewise, for clarity and conciseness, descriptions of well-known functions and structures are omitted in the following description.

The following describes a method and an apparatus for running applets, an electronic device and a storage medium according to the embodiments of the present disclosure with reference to the accompanying drawings.

Figure 1:
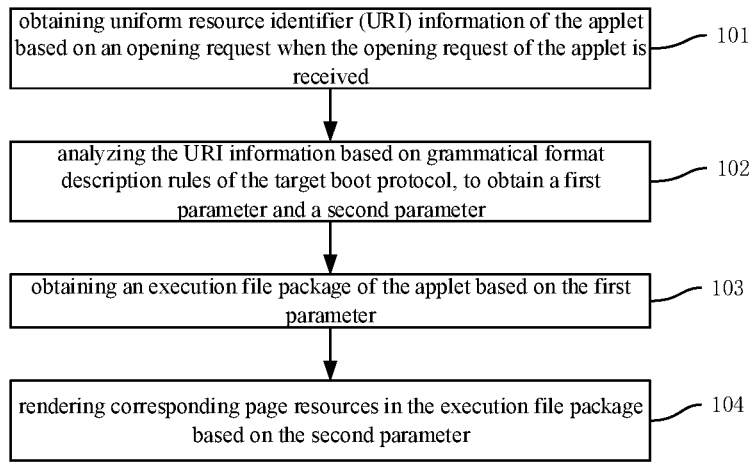
FIG. 1 is a flowchart of a method for running an applet according to an embodiment of the present disclosure.

FIG. 1 is a flowchart of a method for running an applet according to an embodiment of the present disclosure. It should be noted that the method for running the applet in the embodiment of the present disclosure may be applied to the apparatus for running the applet in the embodiment of the present disclosure. The apparatus for running may be configured on an electronic device. As an example, the applet may be hosted on a host application which may be installed on the electronic device. The electronic device here may be a mobile terminal and the mobile terminal may be a hardware device with various operating systems, such as a mobile phone, a tablet computer, or a personal digital assistant.

As shown in FIG. 1, a method for running an applet may include:

Step 101: when an opening request of the applet is received, URI (Uniform Resource Identifier) information of the applet is obtained based on the opening request, wherein a format of the URI may include a protocol name of a target boot protocol and content corresponding to the protocol, and the target boot protocol is a universal boot protocol applied to a plurality of host applications when opening the applet It should be noted that, in the embodiment of the present disclosure, a target boot protocol for opening the applet may be pre-defined and the target boot protocol may be understood as a universal boot protocol applied to a plurality of host applications when opening the applet. In other words, the target boot protocol may be used to open the same applet in different host applications, that is, the target boot protocol supports the plurality of host applications to open the same applet, so that the purpose of opening the applet across clients may be achieved. The target boot protocol defines the grammar of URI information for opening the applet. The grammatical format description specification of URI in the target boot protocol may be defined with an ABNF (Augmented Backus-Naur Form) grammar specification and the relevant rules of RFC 3986 encoding protocol are introduced. For example, the format description specification of the URI in the target boot protocol may conform to the ABNF grammar specification, and the relevant encoding rules for these parameters (such as host, port, path-abempty, query, fragment, and unreserved) in the RFC 3986 encoding protocol are introduced, so that the URI corresponding to a protocol header may be analyzed based on the target boot protocol when the host application identifies the protocol header of the target boot protocol, thereby achieving the opening of applet.

For example, assuming that the target boot protocol is represented by the string "miniappuri", the grammatical format of the target boot protocol may be specified as follows:

miniappuri=scheme "://" authority path-abempty ["?" query] ["# " fragment]
  scheme="miniapp"
  authority=id [";version=" version] ["@" host [ ":" port]]
  id=1*unreserved
  version=*unreserved where the above strings must conform to the rules for a set of URI characters, and the definition about each part of the above grammatical format may be as follows: the "scheme" is a fixed string "miniapp" which may be used as a fixed identification mark of the target boot protocol; the "id" is a logical identifier of the applet in a specific "host" which point to the unique execution file package of the applet in this "host" together with the string "version", since there may be multiple versions of applets corresponding to one "id" in a specific "host"; the "host" must ensure the uniqueness of the "id"; the "version" is configured to identify the unique execution file package of the applet in one "host" together with the string "id" and represents the latest version when its value is empty, in which the rules for "version" may be set by the user agent to provide information such as the version and development method of the execution file package of the applet; the "version" is composed of non-reserved characters and is not sensitive about case; the part of "host" and "port" may be configured to describe the service corresponding to the execution file package of the applet, in which the "host" identifies a specific service such as a domain name and the "port" identifies a port number of the service; the "host" may also be a non-domain name value, such as "development" or "local" in local debugging, which indicates that it is obtained locally; the semantic rules of the "host" are consistent with those of the "host" in RFC 3986 and the semantic rules of the "port" are consistent with those of the "port" in RFC 3986; the "path" represents a path of the applet resources to be opened and corresponds to a path in the applet page, in which it means the homepage of the applet is opened by default when the value for the "path" is empty; the semantic rules of the "path" are consistent with those of the "path" in RFC 3986; the "query" is configured to describe page parameters of the applet and the "fragment" is configured as an anchor point of the applet page, in which the "query" refers to a search query performed in the page to be opened and the query term is a parameter value for the "query" and the "fragment" refers to specific positions for positioning the page to be opened, for example, the anchor point "section-3" will be found from the DOM tree in the page to be opened and this anchor point will be displayed on that page if the parameter value for the "fragment" is "section-3".

Therefore, the URI of the applet may be defined through the above target boot protocol, so that when the client of the host application identifies the URI, the URI may be analyzed based on the target boot protocol to open the applet. Thereby, the target boot protocol may be used to open the same applet in different host applications, so that the purpose of opening the applet across clients may be achieved.

In the embodiment of the present disclosure, when an opening request of the applet is received, the fixed identification mark of the target boot protocol may be identified from the opening request, and URI information of the applet is obtained from a corresponding position in the opening request based on a position of the fixed identification mark. For example, the URI of some applet is "miniapp://foo; version=1.0.1-trial@example.com:9090/pages/index? category=book# section-3" and the fixed identification mark of the target boot protocol is assumed to be the string "miniapp". When an opening request of the applet is received, it may be determined whether the opening request carries a string "miniapp"; when the opening request carries the string "miniapp", it may be determined that protocol header of the target boot protocol is identified. At this time, the position of the string "miniapp" in the opening request may be determined, and the URI information of the applet may be extracted from the information corresponding to that position.

In the embodiment of the present disclosure, the opening request of the applet may be a request generated when the user triggers the corresponding control or the user triggers the opening of the applet by voice, for example, an opening request of the applet is generated when the user clicks on the applet icon, wherein the opening request may carry the URI information of the applet, so that the applet may be opened based on the URI information. It may be seen from the grammatical format description of the target boot protocol that, the URI information may include at least characters of the fixed identification mark and applet identifier of target boot protocol; the URI information may also include any one or more characters of the applet version number, the service corresponding to the applet, and the port number of the service, the path of the applet page to be opened, the page parameters of the applet, and the anchor points of the applet page.

Step 102: the URI information is analyzed based on grammatical format description rules of the target boot protocol, to obtain a first parameter and a second parameter.

In the embodiment of the present disclosure, the first parameter is configured to represent accessible parameters of the target executable file package of the applet. For example, the first parameter may include an applet identifier and an applet version number. The second parameter is configured to represent a parameter of a specific position in a specific page of the applet that may be opened. For example, the second parameter may include a path of an applet page to be opened, a page parameter of the page to be opened and an anchor point of the page to be opened, wherein the page parameter of the page to be opened refers to a query term parameter used when a search query is requested in the page to be opened, and the anchor point of the page to be opened refers to a specific position in the page to be opened. For example, if a parameter value in the URI which is configured to describe the path of the page of the applet to be opened is empty, the content in the second parameter may be analyzed to be the homepage of the applet to be opened by default.

In the embodiment of the present disclosure, the URI information of the applet may be analyzed based on the grammatical format description rules of the target boot protocol to obtain the first parameter for obtaining the target executable file package of the applet and the second parameter for opening the specific position in the specific page of the applet. For example, the URI information of the applet is "miniapp://foo; version=1.0.1-trail@example.com:9090/pages/index?" category=book# section-3", the URI information may be analyzed based on the pre-defined grammatical format description rules of the target boot protocol, to obtain the applet identifier being "foo" (i.e., the applet identifier id is "foo"), the version number of the executable file package being "1.0.1-trial", the service identifier corresponding to the applet ("host") being "example.com", the port number of the service ("port") being "9090", the path of the page of the applet to be opened being "pages/index", the page parameter of the applet ("query") being "category=book", and the anchor point of the applet page ("fragment") being "section-3". The first parameter for obtaining the target executable file package of the applet may be thus obtained, i.e., the applet identifier being "foo", the version number of the executable file package being "1.0.1-trial", the service identifier corresponding to the applet being "example.com" and the port number of the service being "9090". The second parameter for opening the specific position in the specific page of the applet is thus obtained, i.e., the path of the page of the applet to be opened being "pages/index", the page parameter of the applet being "category=book", and the anchor point of the applet page being "section-3".

For another example, the URI information of the applet is "miniapp://foo; version=1.0.1@example.com/pages/index?category=book# section-3", the URI information may be analyzed based on the pre-defined grammatical format description rules of the target boot protocol, to obtain the first parameter for obtaining the target executable package of the applet (i.e., the applet identifier being "foo", the version number of the executable file package being "1.0.1" and the service identifier corresponding to the applet being "example.com"), and the second parameter for opening the specific position in the specific page of the applet (i.e., the path of the page of the applet to be opened being "pages/index", the page parameter of the applet being "category=book" and the anchor point of the applet page being "section-3").

For another example, the URI information of the applet is "miniapp://foo@example.com/?category=img", the URI information may be analyzed based on the pre-defined grammatical format description rules of the target boot protocol, to obtain the first parameter for obtaining the target executable file package of the applet, i.e., the applet identifier being "foo" and the service identifier corresponding to the applet being "example.com"; since a value is empty for the string "version" representing the executable file package of the applet in the URI information, the default executable file package of the applet may be analyzed, which is provided by the service "host" for the applet, and the version of this execution file package may be the latest version, or the default version, or a version that conforms to a certain mapping rule, such as the latest version of the executable file package of the applet to be opened in case that the string "version" is not present in the current URI information. Further, the second parameter for opening the specific position in the specific page of the applet is obtained, wherein since a value for the string "path" in the current URI information is empty, which means that the homepage of the applet would be opened by default, the second parameter may be the page path of the homepage of the applet to be opened, that is, the page parameter of the applet is "category=img".

For another example, the URI information of the applet is "miniapp://foo@example.com", the URI information may be analyzed based on the pre-defined grammatical format description rules of the target boot protocol, to obtain the first parameter for obtaining the target executable package of the applet, i.e., the applet identifier "foo", and the service identifier "example.com" corresponding to the applet; since a value is empty for the string "version" representing the executable file package of the applet in the URI information, the default executable file package of the applet may be analyzed, which is provided by the service "host" for the applet, and the version of this execution file package may be the latest version, or the default version, or a version that conforms to a certain mapping rule, such as the latest version of the executable file package of the applet to be opened if the string "version" is not present in the current URI information. Further, the second parameter for opening the specific position in the specific page of the applet is obtained, wherein since a value for the string "path" in the current URI information is empty, which means that the homepage of the applet would be opened by default, the second parameter may be the page path of the homepage of the applet to be opened.

Step 103: an execution file package of the applet is obtained based on the first parameter.

That is, the first parameter for obtaining the target executable file package of the applet may be utilized to obtain the executable file package of the applet, wherein the executable file package may be obtained from the local cache, or may also be obtained from a server corresponding to the service for the applet. It may be understood that the executable file package of the applet may be similar to the executable file "EXE" of the software, and the executable file package of the applet may include not only business logic code files, but also style files, configuration files, etc.

Step 104: corresponding page resources in the execution file package are rendered based on the second parameter.

That is, after obtaining the execution file package of the applet, the execution file package may be analyzed, and a business logic code file for the page to be rendered is obtained from the execution file package based on the second parameter. The business logic code file may be recompiled and run to obtain running results of the business logic code file, which are provided to a view layer of the applet for corresponding process. Recompiling and running, the corresponding page is displayed based on the running results, thereby achieving the opening of applet.

Figure 2:
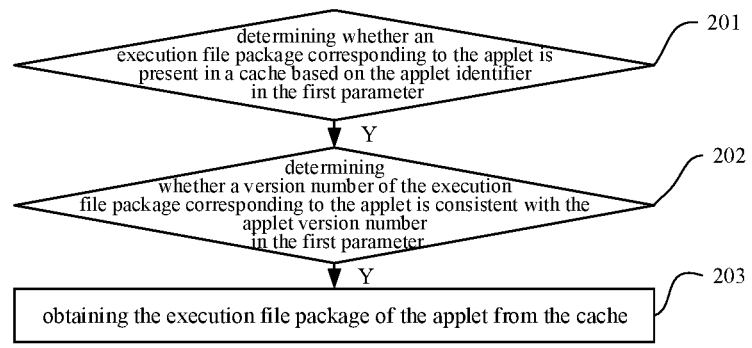
FIG. 2 is a flowchart of a method for running an applet according to another embodiment of the present disclosure.

It should be noted that, the execution file package of the applet may be obtained from the local cache, or may also be obtained from a server corresponding to the service for the applet. In order to reduce resource consumption, improve the efficiency of obtaining the executable file package and improve the efficiency of opening the applet, it may be first determined whether a version of the executable file package corresponding to the applet is present in the local cache based on the applet identifier and the applet version number in the first parameter. Specifically, in an embodiment of the present disclosure, the first parameter may include an applet identifier and an applet version number. As an example, as shown in FIG. 2, the specific implementation of obtaining the executable file package of the applet based on the first parameter may include the following steps:

Step 201: it is determined whether an execution file package corresponding to the applet is present in a cache based on the applet identifier in the first parameter.

That is, it may be determined whether an executable file package corresponding to the applet is present in a local cache based on the applet identifier in the first parameter.

Step 202: it is determined whether a version number of the execution file package corresponding to the applet is consistent with the applet version number in the first parameter in case that the execution file package corresponding to the applet is present in the cache.

That is, in case that the execution file package corresponding to the applet is present in the local cache, a version number of the executable file package of the applet in the local cache may be determined, and it may be determined whether the version number of the executable file package of the applet in the local cache is consistent with the applet version number in the first parameter Step 203: the execution file package of the applet is obtained from the cache in case that the version number of the execution file package corresponding to the applet in the cache is consistent with the applet version number in the first parameter.

As a result, the version of the execution file package corresponding to the applet may be read from the local cache through the applet identifier and the applet version number in the first parameter to avoid interaction with the server, reduce resource consumption, thereby improving the efficiency of obtaining the execution file package, and improving the efficiency of opening the applet. In addition, the existing method for opening the applet does not contain the description of the package version and it is impossible to specify to open a certain version of the package. However, it may be achieved by the present disclosure to specify to open a certain version of the executable file package by defining the version number in the URI.

Figure 3:
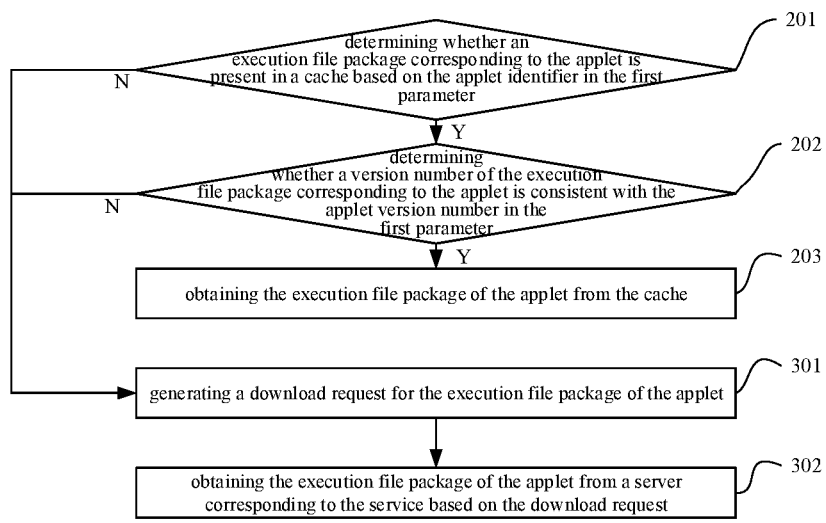
FIG. 3 is a flowchart of a method for running an applet according to yet another embodiment of the present disclosure.

In order to ensure the availability and feasibility of the present disclosure, i.e., ensure that the target executable file package of the target applet in the opening request may be obtained, a target version of executable file package of the target applet may be downloaded from the server corresponding to the service for this applet in case that it is not present in the local cache. Specifically, in an embodiment of the present disclosure, the first parameter further includes the service identifier corresponding to the applet and the port number of the service. As an example, as shown in FIG. 3, the specific implementation of obtaining the executable file package of the applet based on the first parameter may further include the following steps on the basis of FIG. 2:

Step 301: a download request for the execution file package of the applet is generated based on the applet identifier, the applet version number, the service identifier corresponding to the applet and the port number of the service in the first parameter, in case that the execution file package corresponding to the applet is not present in the cache and/or the version number of the execution file package corresponding to the applet in the cache is inconsistent with the applet version number in the first parameter.

That is, in case that the execution file package corresponding to the applet is not present in the local cache and/or the version number of the execution file package corresponding to the applet in the local cache is inconsistent with the applet version number in the first parameter, a request is initiated towards the server described by the service identifier and the port number of the service corresponding to the applet, so as to obtain the execution file package corresponding to the applet, wherein the information such as the applet identifier and the applet version number are carried in the request. For example, in case that the applet identifier ("id") is "foo", the applet version number ("version") is "1.0.1", the service identifier corresponding to the applet ("host") is "example-.com" and the port number of service ("port") is "9090", a download request for the execution file package of the applet may be generated based on the applet identification ("id"), the applet version number ("version"), the service identifier corresponding to the applet ("host") and the port number of the service ("port"), wherein the download request carries respective parameter values for the "id", "version", "host" and "port".

In the embodiment of the present disclosure, an appropriate transmission service for the download request may be selected based on different business scenes, which may be for example, a http (hypertext transfer protocol), a https (hypertext transfer secure protocol), a websocket (full duplex communication protocol based on the TCP (Transmission Control Protocol)) and other transmission modes.

Step 302: the execution file package of the applet is obtained from a server corresponding to the service based on the download request.

For example, transmission connections may be established with the corresponding server based on the service identifier ("host") and the port number of service ("port") corresponding to the applet in the download request, so that the server may extract the applet identifier ("id") and the applet version number ("version") from the download request, and searching is performed based on the applet identifier ("id") and the applet version number ("version") to find the version of executable file package corresponding to the applet. When the server finds out the version of executable file package corresponding to the applet, the executable file package may be returned to the client, so that the client may obtain the version of executable file package corresponding to the applet.

Therefore, in case that the target version of executable file package of the target applet is not present in the local cache, it may be downloaded from the server corresponding to the applet, so as to ensure that the target executable file of the target applet in the opening request may be obtained and further to ensure the availability and feasibility of the present disclosure. The opening of the applet across servers may be unified, which ensures that the applet has multi-terminal operation capabilities.

It should be noted that, in an embodiment of the present disclosure, in case that the version number of the applet is analyzed from the URI information of the applet to be the latest version, that is, it is necessary to run the latest version of the executable file package of the applet. The download request for the execution file package of the applet is generated based on the applet identifier, the applet version number, the service identifier corresponding to the applet and the port number of the service in the first parameter, and the execution file package of the applet is obtained from the server corresponding to the service based on the download request. That is, in case that a value for the identifier character "version" representing the version in the URI information of the applet is empty, it means that the latest version of the executable file package of the applet needs to be run. At this time, it is no longer determined whether the latest version of the executable file package of the applet is present in the local cache, but the latest version of the execution file package of the applet is directly obtained from the server corresponding to the service of the applet, thereby ignoring the step of determining whether the latest version of the execution file package of the applet is present in the local cache, thereby saving the consumption of computing resources.

Figure 4:
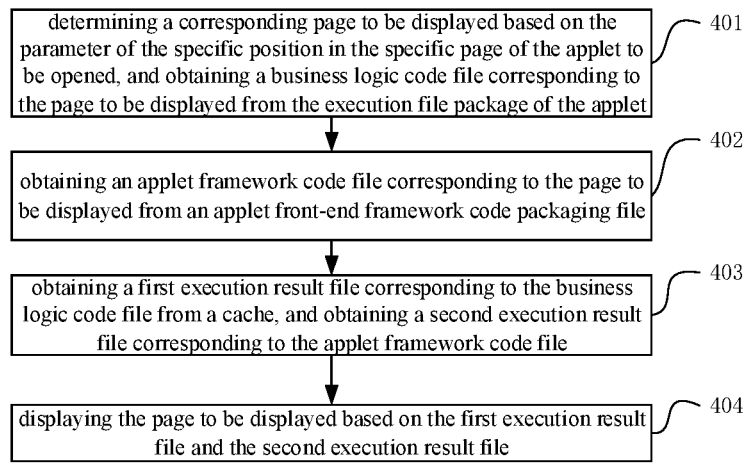
FIG. 4 is a flowchart of a method for running an applet according to yet another embodiment of the present disclosure.

In order to reduce the time required to recompile the code files, reduce the time required for the applet to display the page to be displayed and improve the efficiency of displaying and response efficiency of the applet, respective execution result files corresponding to the business logic code file and the applet framework code file may be directly obtained from the cache. Specifically, in an embodiment of the present disclosure, the second parameter may be configured to represent a parameter of a specific position in a specific page of the applet to be opened. In the embodiment of the present disclosure, a page to be displayed may be determined based on the parameter of the specific position in the specific page of the applet to be opened, and a business logic code file corresponding to the page to be displayed may be obtained from the execution file package of the applet, and page rendering is performed based on the corresponding business logic code file to display the page to be displayed. As an example of a possible implementation, as shown in FIG. 4, the specific implementation of rendering the page resources in the execution file package based on the second parameter may include the following steps:

Step 401: a page to be displayed is determined based on the parameter of the specific position in the specific page of the applet to be opened, and a business logic code file corresponding to the page to be displayed is obtained from the execution file package of the applet.

It may be understood that, the execution file package of the applet may include not only business logic code files, but also style files, configuration files, etc.

In the embodiment of the present disclosure, the business logic code file corresponding to the page to be displayed may be obtained from the execution file package of the applet based on the pre-stored correspondence between the page to be displayed and the business logic code file.

Step 402: an applet framework code file corresponding to the page to be displayed is obtained from an applet front-end framework code packaging file.

In this embodiment, the applet framework code file corresponding to the page to be displayed may be obtained from an applet front-end framework code packaging file based on the pre-stored correspondence between the page to be displayed and the applet framework code file.

Step 403: a first execution result file corresponding to the business logic code file is obtained from a cache, and a second execution result file corresponding to the applet framework code file is obtained.

Specifically, it may be found from the local cache whether there is an execution result file corresponding to the business logic code file based on the path information of the business logic code file. In case that the execution result file corresponding to the business logic code file is found to be present in the local cache, a first execution result file corresponding to the business logic code file is obtained from the local cache.

In this embodiment, the specific process of obtaining a second execution result file corresponding to the applet framework code file from the local cache may be: it is found from the cache whether there is the execution result file corresponding to the business logic code file based on the path information of the applet framework code file; in case that the execution result file corresponding to the business logic code file is found from the cache, the second execution result file corresponding to the applet framework code file is obtained from the cache.

It may be understood that many files are usually stored in the cache. In order to improve the efficiency of finding files from the cache, as an example implementation, a cache index file may be pre-established in the cache. It may be quickly searched whether the execution result file matching the path information of the business logic code file is stored in the cache based on the cache index file, and the matched execution result file is the first execution result file corresponding to the business logic code file.

The process of obtaining the second execution result file corresponding to the applet framework code file based on the pre-established cache index file is similar to the above-mentioned process of obtaining the first execution result file corresponding to the business logic code file, which will not be repeated here.

Step 404: the page to be displayed is displayed based on the first execution result file and the second execution result file.

Alternatively, static resources of the page to be displayed are determine based on the first execution result file and the second execution result file while dynamic resources of the page to be displayed are obtained, and the page to be displayed are generated and displayed based on the static resources and the dynamic resources. In the embodiment of the present disclosure, the static resource may be understood to be data that does not need to be obtained from the server, for example, texts, pictures, and CSS files to be displayed of the page stored in the local cache. The dynamic resources may be understood to be obtained from the server when the business logics corresponding to the page to be displayed are executed.

In an embodiment of the present disclosure, when the execution result file corresponding to the business logic code file is not obtained from the cache, the business logic code file is compiled and executed to obtain a third execution result file corresponding to the business logic code file; and the third execution result file is stored in the cache, so that the corresponding execution result file may be directly obtained from the cache next time the same page to be displayed is required for rendering, thereby saving the time cost required for executing codes and may further improve the efficiency of displaying the applet page.

Therefore, the time required for recompiling the code files and the time required for the applet to display the page to be displayed are reduced by directly obtaining respective execution result files corresponding to the business logic code file and the applet framework code file from the cache. The efficiency of displaying and response efficiency of the applet are thus improved, and the user experience is improved.

According to the method for running the applet according to the embodiment of the present disclosure, URI information of the applet is obtained based on an opening request when the opening request of the applet is received, wherein a format of the URI includes a protocol name of a target boot protocol and content corresponding to the protocol, and the target boot protocol is a universal boot protocol applied to a plurality of host applications when opening the applet; the URI information is analyzed based on grammatical format description rules of the target boot protocol, to obtain a first parameter and a second parameter; an execution file package of the applet is obtained based on the first parameter; and corresponding page resources in the execution file package are rendered based on the second parameter. That is, a target boot protocol for opening the applet is predefined, wherein the target boot protocol may be understood as a universal boot protocol applied to a plurality of host applications when opening the applet, so that the URI information may be analyzed based on grammatical format description rules of the target boot protocol when the opening request of the applet is received, to obtain a first parameter for obtaining an execution file package of the applet and a second parameter for opening a specific position in a specific page of the applet. Further, the execution file package of the applet is obtained based on the first parameter and page resources in the execution file package are rendered based on the second parameter, thereby achieving the opening of the applet. The opening of the applet across clients and servers may be unified through the pre-defined target boot protocol, which provides an important prerequisite for the multi-terminal operation of the applet and ensures that the applet has multi-terminal operation capabilities.

Figure 5:
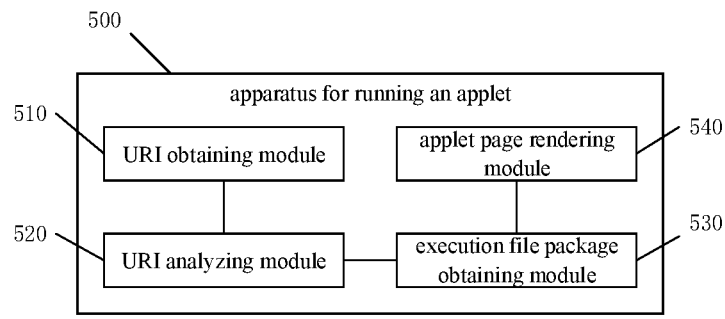
FIG. 5 is a structural schematic diagram of an apparatus for running an applet according to an embodiment of the present disclosure.

Corresponding to the method for running the applet according to the above several embodiments, an embodiment of the present disclosure also provides an apparatus for running an applet. As the apparatus for running the applet according to the embodiment of the present disclosure corresponds to the method for running the applet according to the above several embodiments, the foregoing implementations of the method for running the applet are also suitable for the apparatus for running the applet according to the embodiment of the present disclosure, which will not be described in detail in this embodiment. FIG. 5 is a structural schematic diagram of an apparatus 500 for running an applet according to an embodiment of the present disclosure. As shown in FIG. 5, an apparatus 500 for running an applet may include: a URI obtaining module 510, a URI analyzing module 520, an execution file package obtaining module 530, and an applet page rendering module 540.

Specifically, the URI obtaining module 510 is configured to obtain uniform resource identifier (URI) information of the applet based on an opening request when the opening request of the applet is received, wherein a format of the URI includes a protocol name of a target boot protocol and content corresponding to the protocol, and the target boot protocol is a universal boot protocol applied to a plurality of host applications when opening the applet. As an example, the URI obtaining module may identify a fixed identification mark of the target boot protocol from the opening request, and obtain the URI information of the applet from a corresponding position in the opening request based on a position of the fixed identification mark. The target boot protocol herein is a universal boot protocol applied to a plurality of host applications when opening the applet.

The URI analyzing module 520 is configured to analyze the URI information based on grammatical format description rules of the target boot protocol, to obtain a first parameter and a second parameter.

The execution file package obtaining module 530 is configured to obtain an execution file package of the applet based on the first parameter. In an embodiment of the present disclosure, the first parameter includes an applet identifier and an applet version number. In the embodiment of the present disclosure, the executable file package obtaining module 530 may be configured to determine whether an execution file package corresponding to the applet is present in a cache based on the applet identifier in the first parameter; determine whether a version number of the execution file package corresponding to the applet is consistent with the applet version number in the first parameter in case that the execution file package corresponding to the applet is present in the cache; and obtain the execution file package of the applet from the cache in case that the version number of the execution file package corresponding to the applet in the cache is consistent with the applet version number in the first parameter.

In an embodiment of the present disclosure, the first parameter further includes a service identifier corresponding to the applet and a port number of the service. In the embodiment of the present disclosure, the executable file package obtaining module 530 may be further configured to: generate a download request for the execution file package of the applet based on the applet identifier, the applet version number, the service identifier corresponding to the applet and the port number of the service in the first parameter, in case that the execution file package corresponding to the applet is not present in the cache and/or the version number of the execution file package corresponding to the applet in the cache is inconsistent with the applet version number in the first parameter; and obtain the execution file package of the applet from a server corresponding to the service based on the download request. An appropriate transmission service for the download request herein is selected based on different business scenes; and wherein the transmission service includes at least any one of a hypertext transfer protocol (http), a hypertext transfer secure protocol (https) and a full duplex communication protocol (websocket).

The applet page rendering module 540 is configured to render page resources in the execution file package based on the second parameter. In an embodiment of the present disclosure, the second parameter is configured to represent a parameter of a specific position in a specific page of the applet to be opened. In the embodiment of the present disclosure, the applet page rendering module 540 may be configured to determine a corresponding page to be displayed based on the parameter of the specific position in the specific page of the applet to be opened, and obtaining a business logic code file corresponding to the page to be displayed from the execution file package of the applet; and perform page rendering based on the corresponding business logic code file, to display the page to be displayed. As an example, the specific implementation of performing page rendering based on the corresponding business logic code file to display the page to be displayed may be performed by the applet page rendering module 540 as follows: an applet framework code file corresponding to the page to be displayed is obtained from an applet front-end framework code packaging file; a first execution result file corresponding to the business logic code file is obtained from a cache, and a second execution result file corresponding to the applet framework code file is obtained; and the page to be displayed is displayed based on the first execution result file and the second execution result file.

In an embodiment of the present disclosure, the applet page rendering module 540 is further configured to: compile and execute the business logic code file to obtain a third execution result file corresponding to the business logic code file, in case that the first execution result file corresponding to the business logic code file from the cache is not obtained; and store the third execution result file in the cache.

According to the apparatus of running the applet of the embodiment of the present disclosure, URI information of the applet is obtained based on an opening request when the opening request of the applet is received, wherein a format of the URI includes a protocol name of a target boot protocol and content corresponding to the protocol, and the target boot protocol is a universal boot protocol applied to a plurality of host applications when opening the applet; the URI information is analyzed based on grammatical format description rules of the target boot protocol, to obtain a first parameter and a second parameter; an execution file package of the applet is obtained based on the first parameter; and corresponding page resources in the execution file package are rendered based on the second parameter. That is, a target boot protocol for opening the applet is predefined, wherein the target boot protocol may be understood as a universal boot protocol applied to a plurality of host applications when opening the applet, so that the URI information may be analyzed based on grammatical format description rules of the target boot protocol when the opening request of the applet is received, to obtain a first parameter for obtaining an execution file package of the applet and a second parameter for opening a specific position in a specific page of the applet. Further, the execution file package of the applet is obtained based on the first parameter and page resources in the execution file package are rendered based on the second parameter, thereby achieving the opening of the applet. The opening of the applet across clients and servers may be unified through the pre-defined target boot protocol, which provides an important prerequisite for the multi-terminal operation of the applet and ensures that the applet has multi-terminal operation capabilities.

According to the embodiments of the present disclosure, the present disclosure also provides an electronic device and a readable storage medium.

Figure 6:
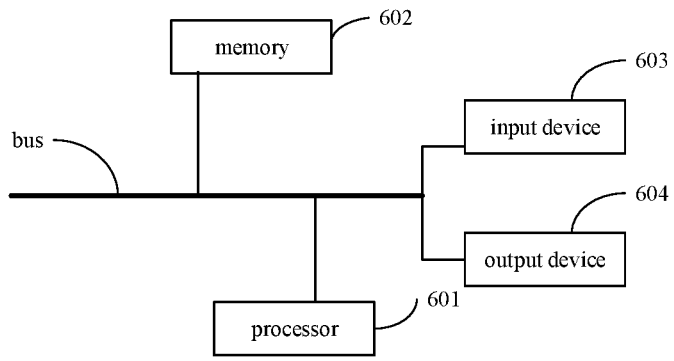
FIG. 6 is a block diagram of an electronic device capable of implementing a method for running an applet according to an embodiment of the present disclosure.

FIG. 6 is a block diagram of an electronic device capable of implementing a method for running an applet according to embodiments of the present disclosure. The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the present disclosure described and/or claimed herein.

As shown in FIG. 6, the electronic device includes: one or more processors 601, a memory 602, and interfaces for connecting various components, including a high-speed interface and a low-speed interface. Various components are connected to each other by different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium according to the present disclosure. The memory 602 is configured to store instructions executable by at least one processor, to enable the at least one processor to execute a method for running an applet according to the present disclosure. The non-transitory computer readable storage medium according to the present disclosure is configured to store computer instructions. The computer instructions are configured to enable a computer to execute the method for running the applet according to the present disclosure.

As the non-transitory computer readable storage medium, the memory 602 may be configured to store non-transitory software programs, non-transitory computer executable programs and modules, such as program instructions/modules (such as, the URI obtaining module 510, the URI analyzing module 520, the execution file package obtaining module 530, and the applet page rendering module 540 illustrated in FIG. 5) corresponding to the method for running the applet according to embodiments of the present disclosure. The processor 601 executes various functional applications and data processing of the server by operating non-transitory software programs, instructions and modules stored in the memory 602, that is, implements the method for running the applet according to the above method embodiment.

The memory 602 may include a storage program region and a storage data region. The storage program region may store an application required by an operating system and at least one function. The storage data region may store data created according to usage of the electronic device for running an applet. In addition, the memory 602 may include a high-speed random access memory, and may also include a non-transitory memory, such as at least one disk memory device, a flash memory device, or other non-transitory solid-state memory devices. In some embodiments, the memory 602 may optionally include memories remotely located to the processor 601, and these remote memories may be connected to the electronic device capable of implementing the method for running the applet via a network. Examples of the above network include, but are not limited to, the Internet, an intranet, a local area network, a mobile communication network and combinations thereof.

The electronic device capable of implementing the method for running the applet may also include: an input device 603 and an output device 604. The processor 601, the memory 602, the input device 603, and the output device 604 may be connected through a bus or in other means. In FIG. 6, the bus is taken as an example.

The input device 603 may receive inputted digital or character information, and generate key signal input related to user setting and function control of the electronic device capable of running the applet, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for running an applet, comprising:
    obtaining uniform resource identifier (URI) information of the applet based on an opening request when the opening request of the applet is received, wherein a format of the URI comprises a protocol name of a target boot protocol and content corresponding to the protocol, and the target boot protocol is a universal boot protocol applied to a plurality of host applications when opening the applet;
    analyzing the URI information based on grammatical format description rules of the target boot protocol, to obtain a first parameter and a second parameter;
    obtaining an execution file package of the applet based on the first parameter; and
    rendering corresponding page resources in the execution file package based on the second parameter;
    wherein the first parameter comprises an applet identifier and an applet version number;
    obtaining the execution file package of the applet based on the first parameter comprises:
    determining whether an execution file package corresponding to the applet is present in a cache based on the applet identifier in the first parameter;
    determining whether a version number of the execution file package corresponding to the applet is consistent with the applet version number in the first parameter in case that the execution file package corresponding to the applet is present in the cache; and
    obtaining the execution file package of the applet from the cache in case that the version number of the execution file package corresponding to the applet in the cache is consistent with the applet version number in the first parameter.

2. The method according to claim 1 wherein the first parameter further comprises a service identifier corresponding to the applet and a port number of the service;
    the method further comprises:
    generating a download request for the execution file package of the applet based on the applet identifier, the applet version number, the service identifier corresponding to the applet and the port number of the service in the first parameter, in case that the execution file package corresponding to the applet is not present in the cache and/or the version number of the execution file package corresponding to the applet in the cache is inconsistent with the applet version number in the first parameter; and
    obtaining the execution file package of the applet from a server corresponding to the service based on the download request.

3. The method according to claim 2, wherein an appropriate transmission service for the download request is selected based on different business scenes; and wherein the transmission service comprises at least any one of a hypertext transfer protocol (http), a hypertext transfer secure protocol (https) and a full duplex communication protocol (websocket).

4. The method according to claim 1, wherein the second parameter is configured to represent a parameter of a specific position in a specific page of the applet to be opened;
    rendering corresponding page resources in the execution file package based on the second parameter, comprises:
    determining a corresponding page to be displayed based on the parameter of the specific position in the specific page of the applet to be opened, and obtaining a business logic code file corresponding to the page to be displayed from the execution file package of the applet; and
    performing page rendering based on the corresponding business logic code file, to display the page to be displayed.

5. The method according to claim 4, wherein performing page rendering based on the corresponding business logic code file, to display the page to be displayed, comprises:
    obtaining an applet framework code file corresponding to the page to be displayed from an applet front-end framework code packaging file;
    obtaining a first execution result file corresponding to the business logic code file from a cache, and obtaining a second execution result file corresponding to the applet framework code file; and
    displaying the page to be displayed based on the first execution result file and the second execution result file.

6. The method according to claim 5, further comprising:
    compiling and executing the business logic code file to obtain a third execution result file corresponding to the business logic code file, in case that the first execution result file corresponding to the business logic code file from the cache is not obtained; and
    storing the third execution result file in the cache.

7. The method according to claim 1, wherein the second parameter comprises a path of an applet page to be opened, a page parameter of the page to be opened and an anchor point of the page to be opened, wherein the page parameter of the page to be opened refers to a query term parameter used when a search query is requested in the page to be opened, and the anchor point of the page to be opened refers to a specific position in the page to be opened.

8. The method according to claim 1, wherein obtaining uniform resource identifier (URI) information of the applet based on the opening request, comprises:
    identifying a fixed identification mark of the target boot protocol from the opening request;
    obtaining the URI information of the applet from a corresponding position in the opening request based on a position of the fixed identification mark.

9. An electronic device, comprising:
    at least one processor; and
    a memory communicatively connected with the at least one processor;
    wherein the memory is configured to store instructions executable by the at least one processor, when the instructions are executed by the at least one processor, the at least one processor is configured to execute a method for running an applet, the method comprising:
    obtaining uniform resource identifier (URI) information of the applet based on an opening request when the opening request of the applet is received, wherein a format of the URI comprises a protocol name of a target boot protocol and content corresponding to the protocol, and the target boot protocol is a universal boot protocol applied to a plurality of host applications when opening the applet;
    analyzing the URI information based on grammatical format description rules of the target boot protocol, to obtain a first parameter and a second parameter;
    obtaining an execution file package of the applet based on the first parameter; and
    rendering corresponding page resources in the execution file package based on the second parameter;
    wherein the first parameter comprises an applet identifier and an applet version number obtaining the execution file package of the applet based on the first parameter comprises:
    determining whether an execution file package corresponding to the applet is present in a cache based on the applet identifier in the first parameter;
    determining whether a version number of the execution file package corresponding to the applet is consistent with the applet version number in the first parameter in case that the execution file package corresponding to the applet is present in the cache; and
    obtaining the execution file package of the applet from the cache in case that the version number of the execution file package corresponding to the applet in the cache is consistent with the applet version number in the first parameter.

10. The electronic device according to claim 9 wherein the first parameter further comprises a service identifier corresponding to the applet and a port number of
    the service; the method further comprises:
    generating a download request for the execution file package of the applet based on the applet identifier, the applet version number, the service identifier corresponding to the applet and the port number of the service in the first parameter, in case that the execution file package corresponding to the applet is not present in the cache and/or the version number of the execution file package corresponding to the applet in the cache is inconsistent with the applet version number in the first parameter; and
    obtaining the execution file package of the applet from a server corresponding to the service based on the download request.

11. The electronic device according to claim 10, wherein an appropriate transmission service for the download request is selected based on different business scenes; and wherein the transmission service comprises at least any one of a hypertext transfer protocol (http), a hypertext transfer secure protocol (https) and a full duplex communication protocol (websocket).

12. The electronic device according to claim 9, wherein the second parameter is configured to represent a parameter of a specific position in a specific page of the applet to be opened;
    rendering corresponding page resources in the execution file package based on the second parameter, comprises:
    determining a corresponding page to be displayed based on the parameter of the specific position in the specific page of the applet to be opened, and obtaining a business logic code file corresponding to the page to be displayed from the execution file package of the applet; and
    performing page rendering based on the corresponding business logic code file, to display the page to be displayed.

13. The electronic device according to claim 12, wherein performing page rendering based on the corresponding business logic code file, to display the page to be displayed, comprises:
   obtaining an applet framework code file corresponding to the page to be displayed from an applet front-end framework code packaging file;
   obtaining a first execution result file corresponding to the business logic code file from a cache, and obtaining a second execution result file corresponding to the applet framework code file; and
   displaying the page to be displayed based on the first execution result file and the second execution result file.

14. The electronic device according to claim 13, wherein the method further comprises:
   compiling and executing the business logic code file to obtain a third execution result file corresponding to the business logic code file, in case that the first execution result file corresponding to the business logic code file from the cache is not obtained; and
   storing the third execution result file in the cache.

15. The electronic device according to claim 9, wherein the second parameter comprises a path of an applet page to be opened, a page parameter of the page to be opened and an anchor point of the page to be opened, wherein the page parameter of the page to be opened refers to a query term parameter used when a search query is requested in the page to be opened, and the anchor point of the page to be opened refers to a specific position in the page to be opened.

16. The electronic device according to claim 9, wherein obtaining uniform resource identifier (URI) information of the applet based on the opening request, comprises:
   identifying a fixed identification mark of the target boot protocol from the opening request;
   obtaining the URI information of the applet from a corresponding position in the opening request based on a position of the fixed identification mark.

17. A non-transitory computer-readable storage medium having computer instructions stored thereon, wherein the computer instructions are configured to cause a computer to execute a method for running an applet, the method comprising:
   obtaining uniform resource identifier (URI) information of the applet based on an opening request when the opening request of the applet is received, wherein a format of the URI comprises a protocol name of a target boot protocol and content corresponding to the protocol, and the target boot protocol is a universal boot protocol applied to a plurality of host applications when opening the applet;
   analyzing the URI information based on grammatical format description rules of the target boot protocol, to obtain a first parameter and a second parameter;
   obtaining an execution file package of the applet based on the first parameter; and
   rendering corresponding page resources in the execution file package based on the second parameter;
   wherein the first parameter comprises an applet identifier and an applet version number obtaining the execution file package of the applet based on the first parameter comprises:
   determining whether an execution file package corresponding to the applet is present in a cache based on the applet identifier in the first parameter;
   determining whether a version number of the execution file package corresponding to the applet is consistent with the applet version number in the first parameter in case that the execution file package corresponding to the applet is present in the cache; and
   obtaining the execution file package of the applet from the cache in case that the version number of the execution file package corresponding to the applet in the cache is consistent with the applet version number in the first parameter.

* * * * *